United States Patent
Yoshida et al.

(10) Patent No.: US 8,606,104 B2
(45) Date of Patent: Dec. 10, 2013

(54) WAVELENGTH SELECTIVE SWITCH

(75) Inventors: Takehiro Yoshida, Hachioji (JP); Koji Matsumoto, Hachioji (JP); Satoshi Watanabe, Tokyo (JP); Masato Narusawa, Hino (JP); Hirofumi Eto, Hachioji (JP)

(73) Assignee: Olympus Corporation, Tokyo (JP)

( * ) Notice: Subject to any disclaimer, the term of this patent is extended or adjusted under 35 U.S.C. 154(b) by 127 days.

(21) Appl. No.: 13/040,479

(22) Filed: Mar. 4, 2011

(65) Prior Publication Data

US 2011/0217037 A1    Sep. 8, 2011

(30) Foreign Application Priority Data

Mar. 4, 2010    (JP) ................................. 2010-047818

(51) Int. Cl.
*H04J 14/00*    (2006.01)

(52) U.S. Cl.
USPC ................... 398/48; 398/45; 398/49; 398/50; 398/56; 398/79; 398/81; 398/33; 398/147; 398/83; 398/159; 385/24; 385/37; 385/16; 385/17; 385/18

(58) Field of Classification Search
USPC ........... 398/45, 46, 47, 48, 49, 50, 55, 56, 57, 398/79, 81, 83, 82, 84, 88, 33, 38, 87, 147, 398/158, 159; 385/24, 37, 16, 17, 18, 14, 385/15, 46, 47, 19
See application file for complete search history.

(56) References Cited

U.S. PATENT DOCUMENTS 7,447,399 B2 *   11/2008   Aota et al. ...................... 385/18
8,165,470 B2 *   4/2012    Aota et al. ...................... 398/96

FOREIGN PATENT DOCUMENTS

| JP | 2003-509714 | 3/2003 |
| JP | 3937403 | 4/2007 |
| WO | WO 01/20372 A2 | 3/2001 |
| WO | WO 02/075410 A1 | 9/2002 |

* cited by examiner

*Primary Examiner* — Hanh Phan
(74) *Attorney, Agent, or Firm* — Scully, Scott, Murphy & Presser, P.C.

(57) ABSTRACT

A wavelength selective switch includes a substrate. On the substrate, the wavelength selective switch includes at least one input port, a dispersive element, a light converging element, a light deflecting member, an output port, and a driving mechanism which drives at least one of the dispersive element, the light condenser element, and the light deflecting member, and drive by the driving mechanism is a rotational drive around an axis perpendicular to the substrate, for the dispersive element, and is a translational drive in a direction of dispersion of wavelength with respect to the substrate, for the light condenser element or the light deflecting member.

11 Claims, 17 Drawing Sheets

FIG. 8

| TEMPERATURE (°C) | PIEZO DRIVE CONTROL VALUE |
|---|---|
| −5 | 0x0000 |
| −4 | 0x0004 |
| ⋮ | ⋮ |
| Tx | 0xXXXX |
| ⋮ | ⋮ |
| 80 | 0xFFFF |

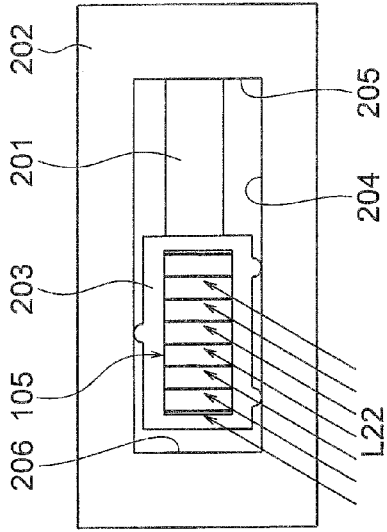
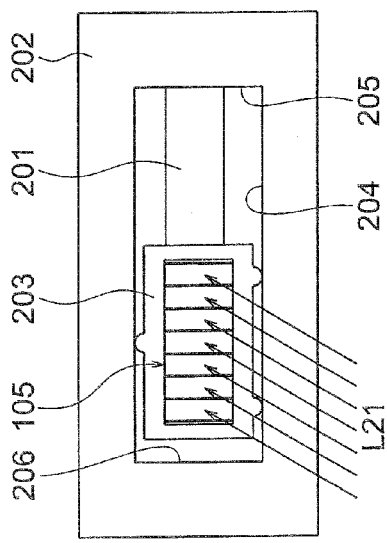
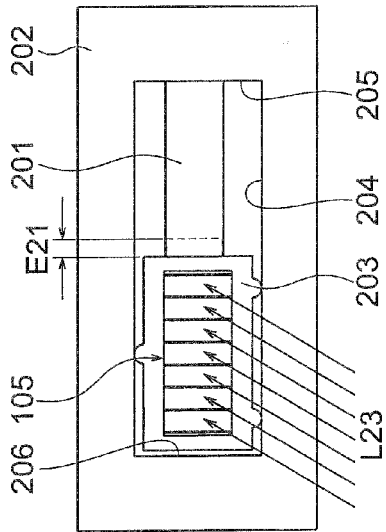

WAVELENGTH SELECTIVE SWITCH

CROSS-REFERENCE TO RELATED APPLICATION

The present application is based upon and claims the benefit of priority from the prior Japanese Patent Application No. 2010-047818 filed on Mar. 4, 2010; the entire contents of which are incorporated herein by reference.

BACKGROUND OF THE INVENTION

1. Field of the Invention

The present invention relates to a wavelength selective switch.

2. Description of the Related Art

A basic structure of a wavelength selective switch has been disclosed in Japanese Patent No. 3937403, in the name of optical add-drop multiplexer.

Here, the wavelength selective switch is a device to be placed in a node in an ROADM (reconfigurable optical add-drop multiplexer) (a system or a technology used in a large-capacity network in which, a wavelength-multiplexed optical signal is add/drop an optical signal as it is), and is an optical switch which carries out for each wavelength, switching of a transmission path of a light signal which has been wavelength-multiplexed.

By the wavelength selective switch in each node, it is possible to select an optical signal of an arbitrary wavelength from the optical signal which has been wavelength-multiplexed, and to combine light of an arbitrary wavelength with the optical signal which has been wavelength-multiplexed. In this wavelength selective switch, a diffraction grating is used as a dispersive element.

Moreover, a light dispersing device which includes a diffraction grating as a dispersive element, which is insensitive to temperature, and of which, an output angle does not change, has been disclosed in Unexamined Patent Publication (Japanese Patent Application Laid-open Publication) No. 2003-509714.

In Japanese Patent Application Laid-open Publication No. 2003-509714, changing of dispersion characteristics according to a change in the temperature has been raised as an issue, and a countermeasure has been taken. Japanese Patent Application Laid-open Publication No. 2003-509714 has been shown a change in the dispersion characteristics according to the change in the temperature is caused by a thermal expansion of the diffraction grating. However, in a large number of cases, a change in a refractive index of air, and a change in a refractive index of the dispersive element due to the change in the temperature when light pass through the dispersive element are a main cause of the change in dispersion characteristics. When the dispersion characteristics change, there is a disadvantage that a frequency band which is controlled by respective deflecting elements in the wavelength selective switch changes due to the change in the temperature.

Particularly, the change in the dispersion characteristics is substantial when a dispersive element in which, a material having a high refractive index is used. Due to such reason, in the conventional wavelength selective switch, it was difficult to have stable dispersion characteristics with respect to the change in the temperature.

SUMMARY OF THE INVENTION

The present invention has been made in view of the abovementioned circumstances, and an object of the present invention is to provide a wavelength selective switch in which, accurate switching is possible even when dispersion characteristics of a dispersive element have changed due to a change in the temperature.

To solve the abovementioned problems, and to achieve the object, the wavelength selective switch according to the present invention includes a substrate, and, on the substrate the wavelength selective switch includes at least one input port from which, wavelength-multiplexed light is made to be incident in the wavelength selective switch, a dispersive element which receives the light from the input port, and disperses the light, a light condenser element which converges light for each wavelength which has been dispersed by the light dispersive element, a light deflecting member including a plurality of deflecting elements, which is capable of deflecting light for each wavelength from the light condenser element, independently for each wavelength, an output port which receives light for each wavelength which has been deflected by the light deflecting member, and a driving mechanism which drives at least one of the dispersive element, the light condenser element, and the light deflecting member, and drive by the driving mechanism is a rotational drive around an axis perpendicular to the substrate, for the dispersive element, and is a translational drive in a direction of dispersion of wavelength with respect to the substrate, for the light condenser element of the light deflecting member.

In the wavelength selective switch according to the present invention, it is preferable that the following expression (1) is satisfied for all $v_{iL} \leq v_i \leq v_{iH-1}$ and $T_L < T < T_H$.

$$\left| \frac{S(v_{iL}, T)S(v_i, T) - S(v_{iL}, T_L)S(v_i, T_L)}{S(v_i, T_L)S(v_{i+1}, T_L)} \right| \leq 0.05. \quad (1)$$

where, $v_i$ denotes a grid frequency, $v_{iL}$ denotes the lowest grid frequency of a spectral band, $v_{iH}$ denotes the highest grid frequency of the spectral band, iL, i, and iH denote integer numbers which satisfy a relationship $iL \leq i \leq iH$, $v_i < v_{i+1}$, T denotes a temperature, $T_L$ denotes a lowest temperature in an operating temperature limit, $T_H$ denotes a highest temperature in the operating temperature limit, $T_L < T < T_H$, $S(v_i, T)$ is a point of intersection of a principal ray of light of the frequency $v_i$ at temperature T, and a plane overlapping the light deflecting member, and a distance between two points $S_1$ and $S_2$ is expressed by the following expression (2).

$$\overline{S_1 S_2} \quad (2)$$

It is preferable that the wavelength selective switch according to the present invention includes a temperature measuring section which measures a temperature inside an apparatus, and a control section which receives temperature information from the temperature measuring section, and makes the driving mechanism drive by a drive amount based on the temperature information.

In the wavelength selective switch according to the present invention, it is preferable that the driving mechanism includes an expanding and contracting member which expands and contracts according to a change in the temperature.

In the wavelength selective switch according to the present invention, it is preferable that the following expression (3) is satisfied for all $v_{iL} \leq v_i \leq v_{iH-1}$ and $T_L < T < T_H$.

$$\left| \frac{\theta_G(v_i, T) - \theta_G(v_i, T_L)}{\theta_G(v_i, T_L) - \theta_G(v_{i+1}, T_L)} \right| \leq 0.05 \quad (3)$$

where, $\theta_G(v_i, T)$ is an angle of deflection by the deflecting element of light of frequency $v_i$ at temperature T.

It is preferable that the wavelength selective switch according to the present invention includes a temperature measuring section which measures a temperature inside an apparatus, and a control section which receives temperature information from the temperature measuring section, and makes the driving mechanism drive by a drive amount based on the temperature information.

In the wavelength selective switch according to the present invention, it is preferable that the driving mechanism includes an expanding and contracting member which expands and contracts according to a change in the temperature.

BRIEF DESCRIPTION OF THE DRAWINGS

FIG. 8 is a table shown by associating a drive control value of a piezo actuator (a piezoelectric actuator) of the first embodiment with temperature;

FIG. 10A is a diagram showing a state of the driving mechanism at a room temperature, FIG. 10B is a diagram showing a shift of incident rays in a direction of mirror array when a temperature has become higher than the room temperature, and FIG. 10C is a diagram showing a shift of an MEMS (micro electro mechanical system) mirror array in a direction of mirror array when the temperature has become higher than the room temperature;

DETAILED DESCRIPTION OF THE INVENTION

Exemplary embodiments of a wavelength selective switch according to the present invention will be described below in detail by referring to the accompanying diagrams. However, the present invention is not restricted to the embodiments described below.

First Embodiment

Figure 1:
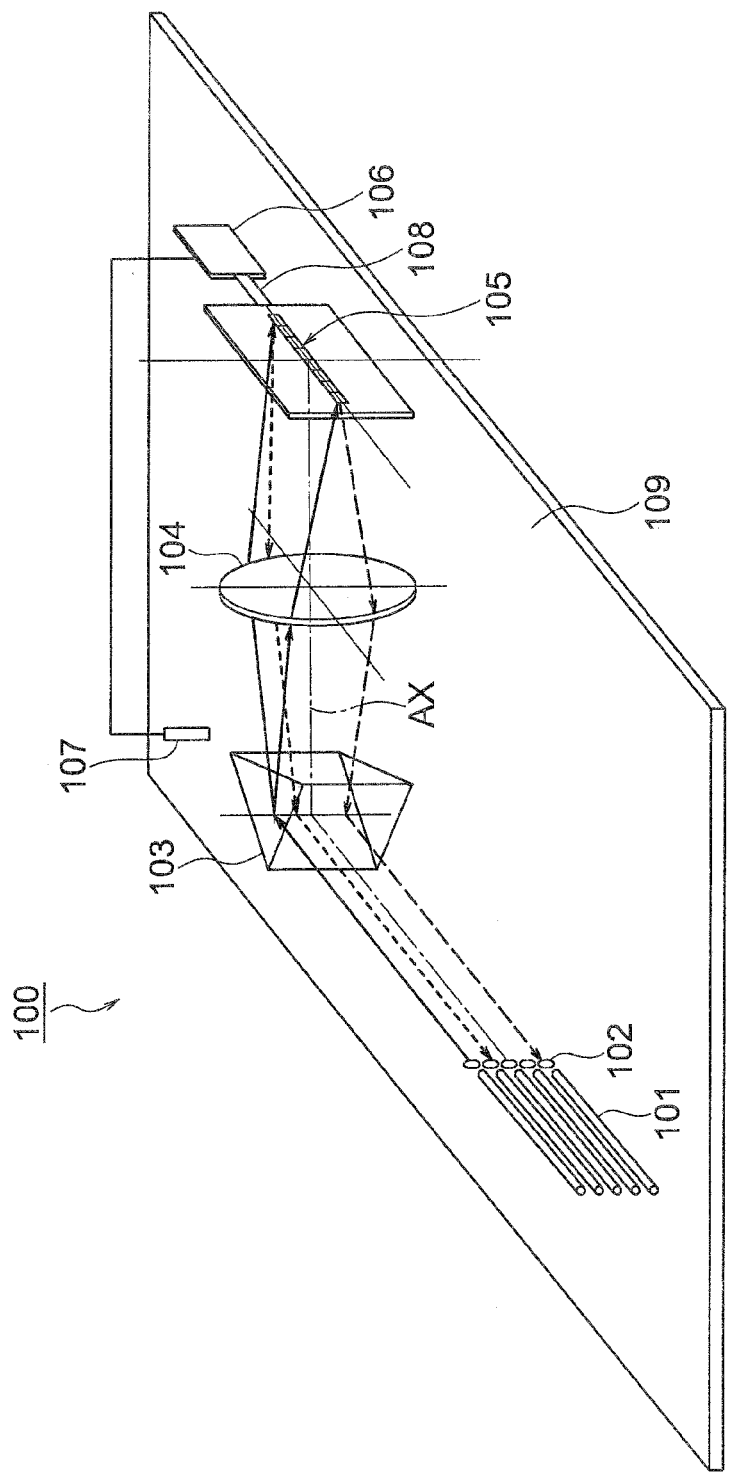
FIG. 1 is a diagram showing an example of a structure of a wavelength selective switch according to a first embodiment of the present invention.

To start with, a structure and an operation at a room temperature of a wavelength selective switch according to the first embodiment will be described below. FIG. 1 is a diagram showing an example of the structure of the wavelength selective switch according to the first embodiment.

A wavelength selective switch 100 of the first embodiment is a wavelength selective switch of a so-called transmission type. The wavelength selective switch 100 includes on a substrate 109, a fiber array 101 made of a plurality of optical fibers, a micro lens array 102, a grating 103, a lens 104, and an MEMS mirror array 105 which is an MEMS (Micro Electro Mechanical System) module.

Each optical fiber in the fiber array 101 (an input port and an output port) corresponds to each micro lens in the micro lens array 102. The pairs of the optical fiber and the micro lens are disposed in an array form. The fiber array 101 functions as a light input-output port. Signal light which is wavelength-multiplexed is output (emitted) from one of the optical fibers (hereinafter, called as 'a first optical fiber') toward the grating 103. Light is from the optical fiber is converted to a parallel light beam at the micro lens array 102.

Light output from the micro lens array 102 is incident on the grating 103 (a dispersive element). The grating 103 disperses the wavelength-multiplexed light.

The lens 104 guides the light dispersed by the grating 103 to a predetermined position for each wavelength, on the micro mirror array 105 which is a light deflecting member.

Figure 2:
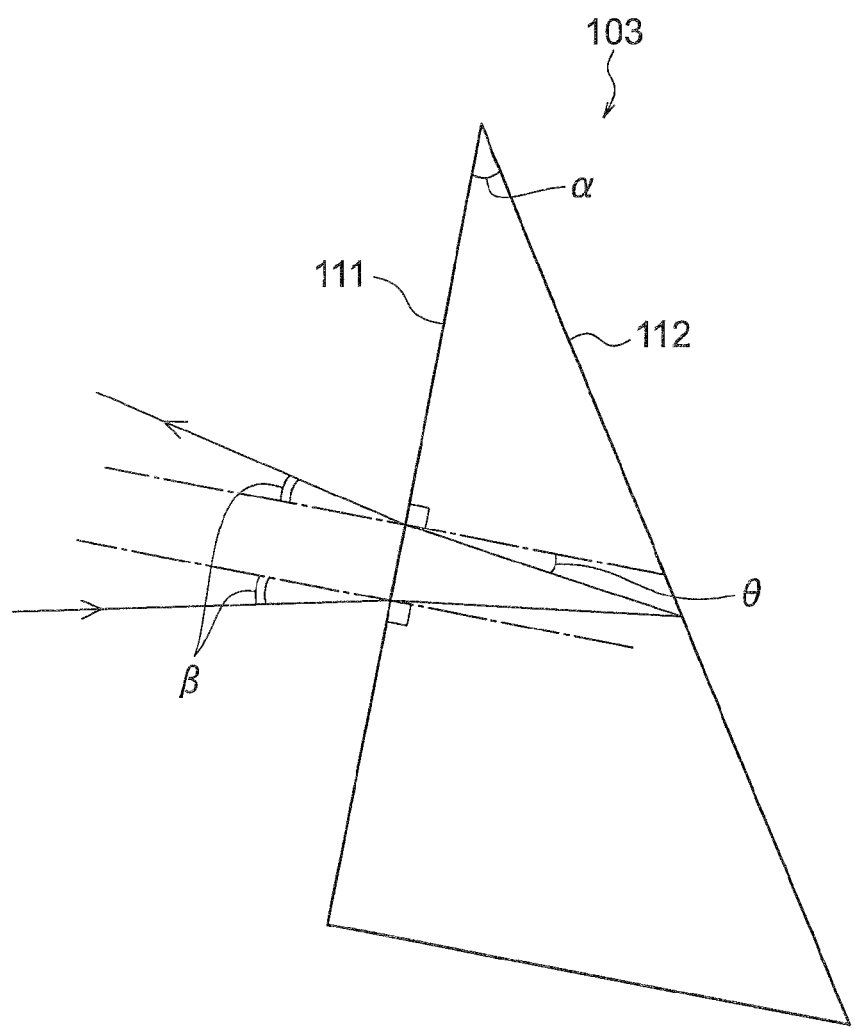
FIG. 2 is a plan view showing an example of a structure of a grating according to the first embodiment.

The grating 103 is a so-called immersion grating in which, a reflecting grating G is formed on a silicon prism of an apex angle 34° (FIG. 2). A diffracting surface 112 of the grating 103 is filled by silicon, and 2500 grooves per millimeter are formed. Here, FIG. 2 is a plan view showing an example of a structure of a grating. In an example in FIG. 2, an angle of incidence and an angle of output of light on a surface of incidence 111 of the grating 103 with an apex angle $\alpha$, are $\beta$, and an angle of refraction is $\theta$.

The MEMS micro mirror array 105 (a light deflecting member) has an array of a plurality of micro mirrors M (FIG. 3) which are disposed to be lined up in a direction of dispersion of wavelength corresponding to the wavelength of light dispersed in the form of a band at the grating 103. Moreover, the MEMS mirror array 105 is provided with a driving mechanism 108 which will be described later.

Figure 3:
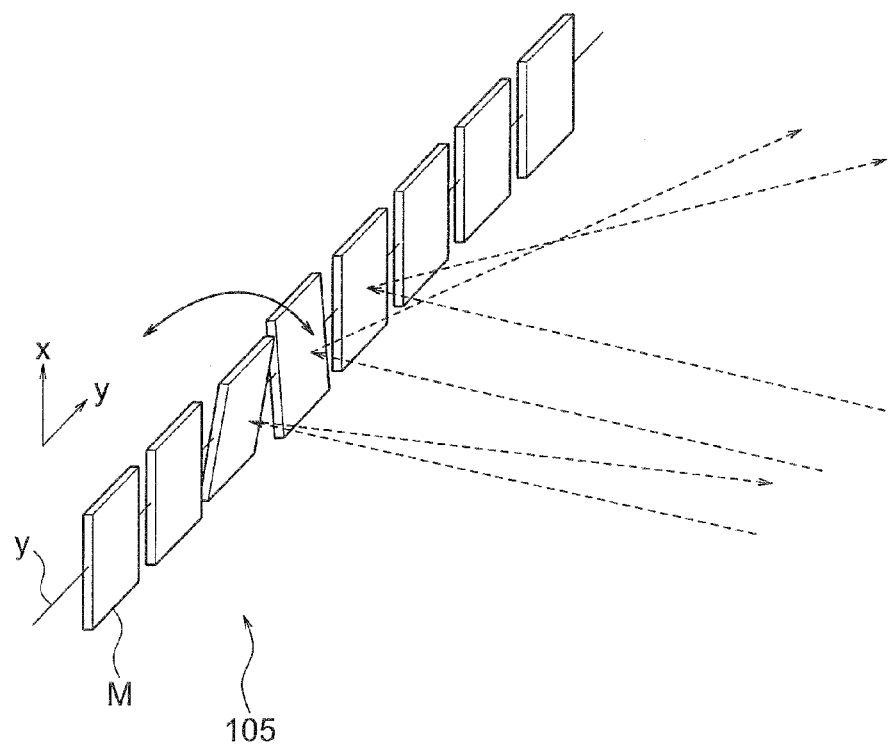
FIG. 3 is a perspective view showing a structure of an MEMS mirror array according to the first embodiment.

FIG. 3 is a perspective view showing a structure of the MEMS mirror array 105.

The micro mirror M, as shown in FIG. 3, has mirrors, each rotatable around local x-axis and y-axis, and reflects light incident thereon, in a direction different from the direction of incidence, by rotating mainly around y-axis.

Light reflected in the same direction (A) which differs from the direction of incidence, by the plurality of micro mirrors M in the mirror array is collected on the grating 103 by the lens 104, and is combined to one light beam of multi wavelength component upon diffraction. Whereas, light reflected in a direction different from the direction of incidence and direction A is relayed on the grating 103 by the lens 104, and is diffracted, but is not integrated with the light reflected in direction A.

These light are incident on different fibers, other than an input port of the fiber array 101.

In this manner, the multi wavelength component light which is launched from the first optical fiber can be made to be incident selectively on another optical fiber by an angle of inclination of the respective mirrors M of the MEMS micro mirror array for each wavelength.

In this embodiment, coupling from one input port to the plurality of output ports has been described. However, it is also possible to couple from a plurality of input ports to one output port.

In the first embodiment, the fiber array 101 is an input port from which, a wavelength-multiplexed light in the wavelength selective switch is made to be incident, the grating 103 is a dispersive element which receives light from the fiber array 101, and disperses the light received, the lens 104 is a light condenser element which converges light for each wavelength which has been dispersed, the MEMS mirror array 105 is a light deflecting member which is capable of deflecting the light from the lens 104, independently for each wavelength, the fiber array 101 is an output port which receives light from the MEMS mirror array 105.

Next, an operation when the temperature has changed will be described below.

Optical characteristics of a wavelength selective switch change when the temperature has changed. A main cause of the change in the optical characteristics is a change in a refractive index of an immersion medium of the grating 103. Other reasons for the change in the optical characteristics are reasons such as a linear expansion of the grating 103, a change in the refractive index of the lens 104, and a position shift with respect to the substrate 109 with a change in the temperature of the grating 103, the lens 104, or the MEMS mirror array 105.

For silicon which is used for the immersion medium of the grating 103, the change in the refractive index with respect to the change in the temperature is tens of times as compared to a normal optical glass. Consequently, a direction in which, light output from the first optical fiber of the fiber array 101 is directed after passing through the grating 103 differs from a direction at the room temperature, and also a position at which the light output from the first optical fiber fall on the MEMS mirror array 105 differs from a position at the room temperature.

Figure 4:
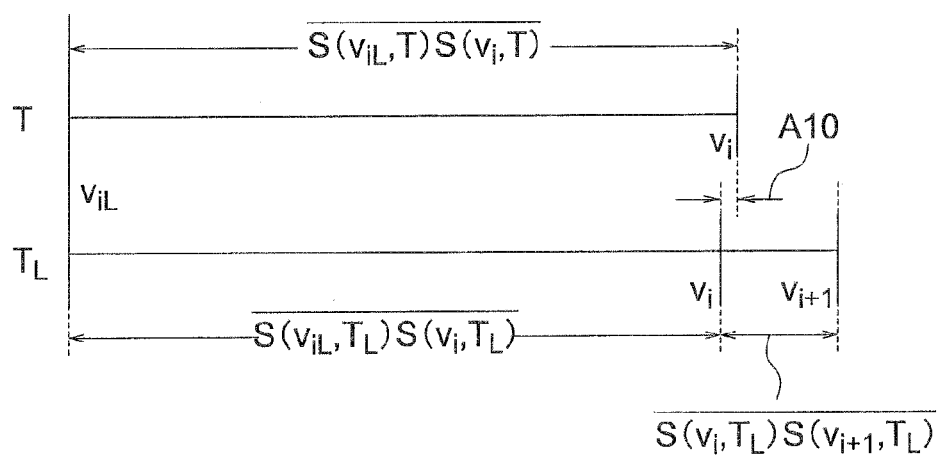
FIG. 4 is a diagram describing about a distance of two signal lights.

Next, a distance of two adjacent signal lights when there has been a temperature change will be described below. FIG. 4 is a diagram describing about a distance of two signal lights. Here, $v_i$ denotes a grid frequency, $v_{iL}$ denotes the lowest grid frequency of a spectral band, $v_{iH}$ denotes the highest grid frequency of the spectral band, iL, i, and iH denote integer numbers which satisfy a relationship $iL \le i \le iH$, $v_i < v_{i+1}$, T denotes a temperature, $T_L$ denotes a lowest temperature in a range of a operating temperature, $T_H$ denotes a highest temperature in the range of the operating temperature, $T_L < T < T_H$, and $S(v_i, T)$ is a point of intersection of a principal ray of light of the frequency $v_i$ at temperature T, and a plane overlapping the light deflecting member.

When a distance between the two points $S_1$ and $S_2$ is expressed by the following conditional expression (2), a distance between two points at which two adjacent signal wavelengths which are discretized, intersect with the MEMS mirror array at the lowest temperature $T_L$ in the operating temperature range is expressed by the following expression (4).

$$\overline{S_1 S_2} \quad (2)$$

$$\overline{S(v_i, T_L) S(v_{i+1}, T_L)} \quad (4)$$

Moreover, a change in a distance between spots (A10 in FIG. 4) of light of the lowest grid frequency $v_{iL}$ and light of the grid frequency $v_i$ when the temperature has changed from the lowest temperature $T_L$ to the temperature T ($T_L < T$) is expressed by the following expression (5).

$$\overline{S(v_{iL}, T) S(v_i, T)} - \overline{S(v_{iL}, T_L) S(v_i, T_L)} \quad (5)$$

By adjusting a mirror at an end in the MEMS mirror array 105 to a position of the light of the lowest grid frequency $v_{iL}$ by moving the entire MEMS mirror array 105 with respect to the substrate 109 such that a ratio of the abovementioned expression (5) divided by the abovementioned expression (4) becomes sufficiently small, or in other words, such that the following expression (1) is satisfied, $$\left| \frac{\overline{S(v_{iL}, T)S(v_i, T)} - \overline{S(v_{iL}, T_L)S(v_i, T_L)}}{\overline{S(v_i, T_L)S(v_{i+1}, T_L)}} \right| \le 0.05 \quad (1)$$

the light of the grid frequency $v_i$ falls fairly near the same position of the same mirror when the temperature is the lowest temperature $T_L$.

It is preferable to design an optical system such that this is satisfied for the temperature T and the grid frequency $v_i$ in a range indicated by the following expressions (6) and (7).

$$v_{iL} \le v_i \le v_{iH-1} \quad (6)$$

$$T_L < T < T_H \quad (7)$$

For such optical system, when the entire MEMS mirror array 105 is moved appropriately corresponding to the operating temperature, each signal light comes to a position which is switched in the MEMS mirror array 105 corresponding to each wavelength.

Next, a control mechanism 106 and the driving mechanism 108 of the MEMS mirror array 105 will be described below by referring to FIG. 5 and FIG. 6.

Figure 5:
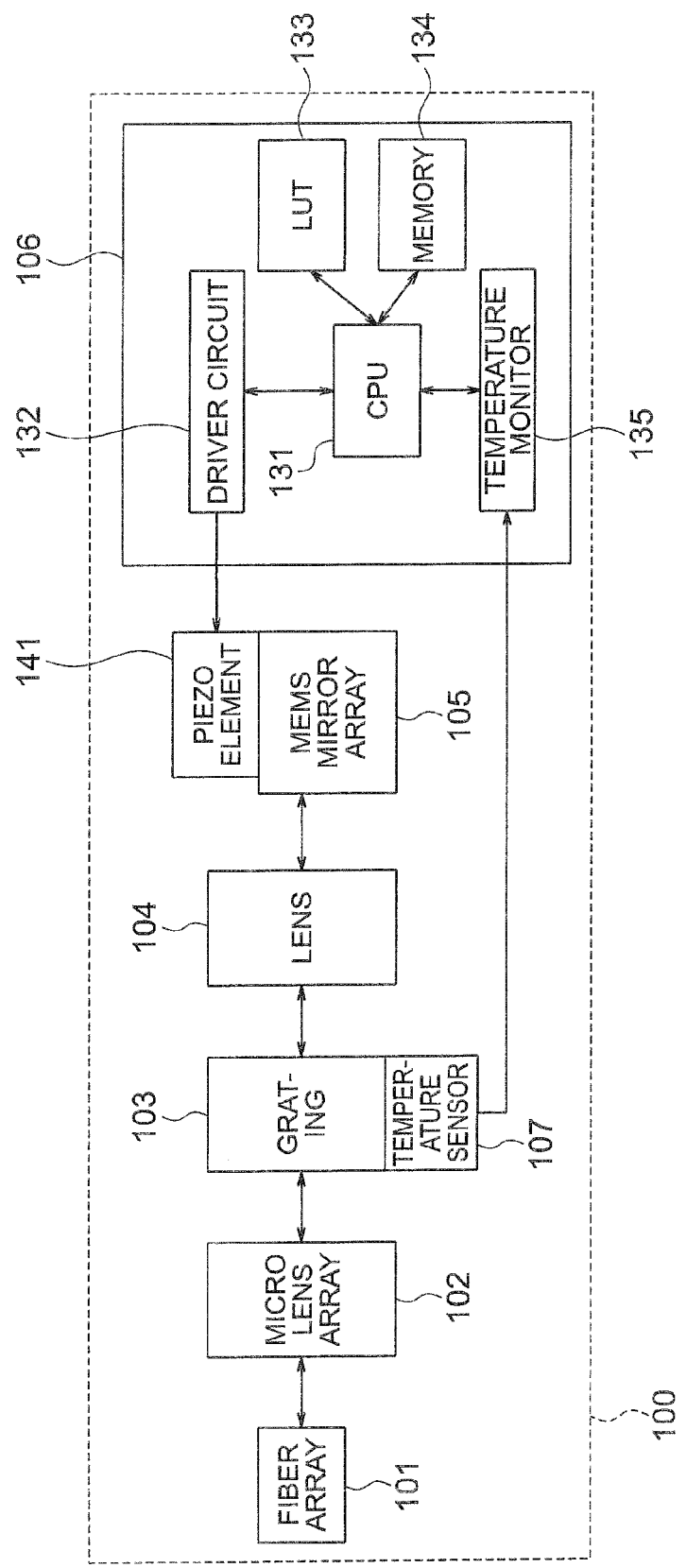
FIG. 5 is a block diagram showing an example of the structure of the wavelength selective switch according to the first embodiment.
Figure 6:
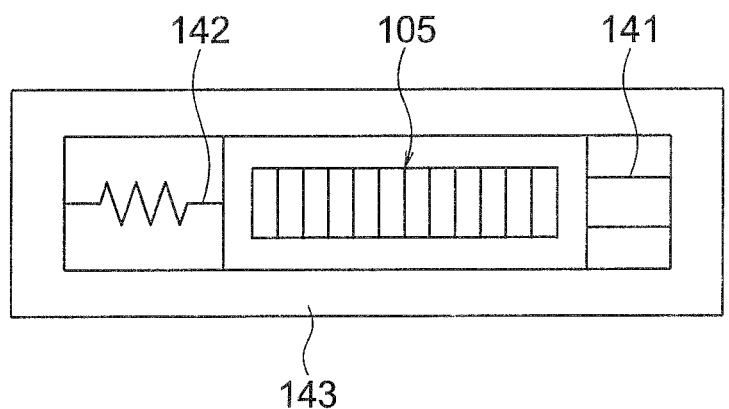
FIG. 6 is a diagram showing a structure of a driving mechanism according to the first embodiment.

FIG. 5 is a block diagram showing an example of a structure of the wavelength selective switch 100 according to the first embodiment. FIG. 6 is a diagram showing a structure of the driving mechanism 108 according to the first embodiment.

First of all, a structure of the driving mechanism 108 and the control mechanism 106 of the MEMS mirror array 105 in FIG. 5 will be described below.

The wavelength selective switch 100 includes in order from a side of the fiber array 101, the micro lens array 102, the grating 103, a temperature sensor 107, the lens 104, the MEMS mirror array 105, a piezo actuator 141, and the control mechanism 106.

The temperature sensor 107 monitors a temperature at an interior of the wavelength selective switch 100, and particularly, a temperature near the grating 103, and detects a change in the temperature of the grating 103 for controlling the position of the MEMS mirror array 105 according to the temperature, by the piezo actuator 141. The piezo actuator 141 is connected as the driving mechanism 108 to the MEMS mirror array 105, and moves the MEMS mirror array 105 in a direction in which the array is arranged to be lined up.

The control mechanism 106, based on a value detected by the temperature sensor 107, refers to an amount of drive of the piezo actuator 141 from an LUT (Look Up Table) 133, and carries out drive control of the piezo actuator 141.

The control mechanism 106 includes a temperature monitor 135 which monitors an output of the temperature sensor 107 as a temperature value, a memory 134 for storing and recording the temperature value of the temperature monitor 135, a driver circuit 132 for driving the piezo actuator 141, the LUT 133 in which, a control value of the driver circuit 132 which drives the piezo actuator 141 with respect to an arbitrary temperature, and a CPU (central processing unit) 131 which compares the temperature value of the temperature monitor 135 and the temperature value recorded in the memory 134, and upon referring to the LUT 133, outputs a control signal to the driver circuit 132.

The structure of the driving mechanism 108 will be described below by using FIG. 6. The MEMS mirror array 105 is disposed at an interior of a holding member 143, to be slidable in a direction of array (a direction in which the array is aligned). One end of the piezo actuator 141 is fixed to one end in the direction of array of the MEMS mirror array 105, and one end of an elastic member 142 (such as a spring) is fixed to the other end of the piezo actuator 141. The other end of the piezo actuator 141 is fixed to an inner wall of the holding member 143, and the other end of the elastic member 142 is also fixed to the inner wall of the holding member 143. The fixing of the piezo actuator 141 and the elastic member 142 is carried out by a method such as sticking. Accordingly, the piezo actuator 141, the MEMS mirror array 105, and the elastic member 142 are lined up along the direction of array (the direction in which the array is lined up) of the MEMS mirror array 105, and the HEMS mirror array 105 slides according to an expansion and a contraction of the piezo actuator 141.

Figure 7:
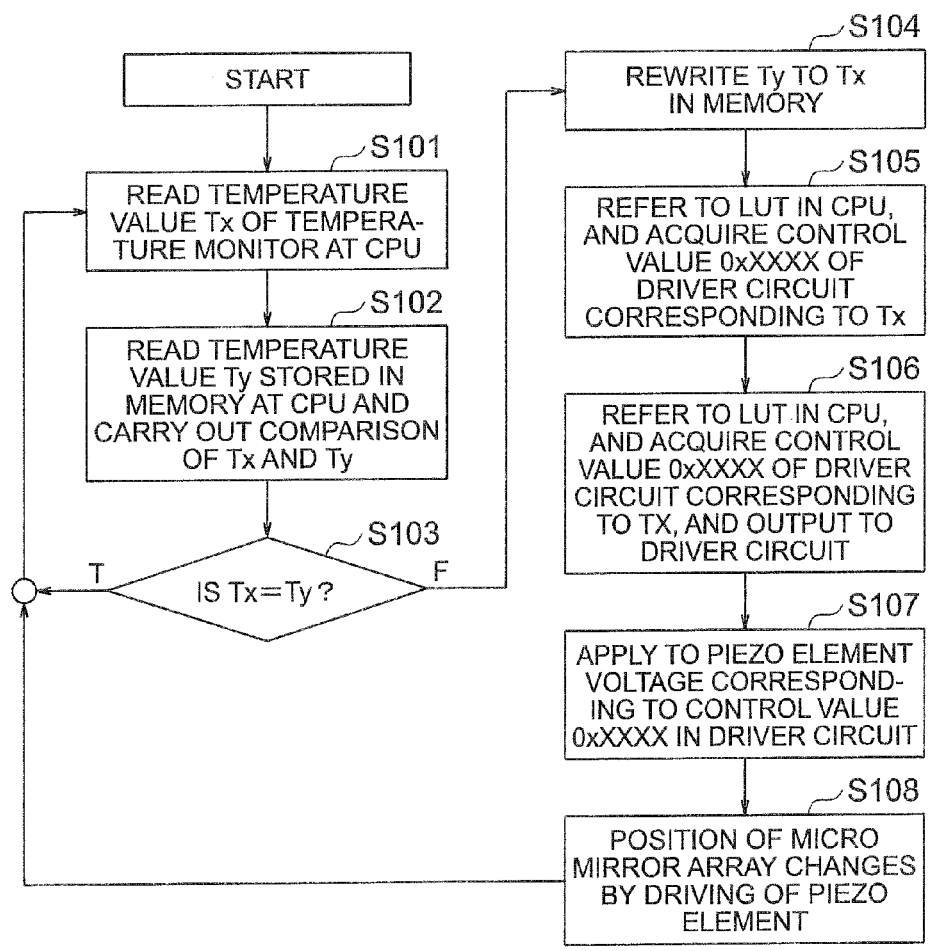
FIG. 7 is a flowchart showing a flow of an operation of the wavelength selective switch according to the first embodiment.

Next, an operation of the wavelength selective switch 100 according to the first embodiment will be described by using FIG. 7. FIG. 7 is a flowchart showing a flow of the operation of the wavelength selective switch 100 according to the first embodiment. FIG. 8 is a table shown by associating a drive control value of the piezo actuator 141 with temperature.

A drive control value with respect to each temperature as shown in FIG. 8 for example is acquired as a reference in the LUT 133. In FIG. 8, 0xXXXX is stored as a drive control value at temperature Tx for example. Here, '0xXXXX' denotes a hexadecimal number of six digits.

In the following description, temperature value Ty is stored in the memory 134, and an initial value is let to be Ty=0. Moreover, the temperature value of the temperature monitor 135 is let to be Tx.

The temperature at the interior of the wavelength selective switch 100 is acquired by the temperature monitor 135, and a change in the temperature at the interior of the wavelength selective switch 100 is monitored by the CPU 131.

Firstly, the CPU 131 reads the temperature value Tx of the temperature monitor 135 (step S101). Next, the CPU 131 compares the temperature value Tx which has been read, and the temperature value Ty which has been stored in the memory 134 (step S102).

When the result of comparison in Tx=Ty (T at step S103), steps from step S101 to step S103 are repeated till the temperature change occurs.

Whereas, when the result of comparison is Tx≠Ty (F at step S103), the value of Ty in the memory 134 is rewritten to Tx (step S104). Next, the CPU 131 refers to the LUT 133, and acquires the control value 0xXXXX of the driver circuit 132 corresponding to Tx (step S105). Furthermore, the CPU 131 outputs the control value acquired to the driver circuit 132 as a control signal (step S106).

Next, the driver circuit 132 applies a voltage corresponding to the control value 0xXXXX to the piezo actuator 141 (step S107). Accordingly, the piezo actuator 141 is driven, and the MEMS mirror array 105 moves to a position at the temperature Tx (step 108).

From here onward, abovementioned steps from step S101 to step S103 are repeated till the temperature change occurs, and whenever Tx and Ty are detected to be Tx≠Ty (F at step S103), steps from step S104 to step S108 are carried out.

By the abovementioned operation, when the temperature change occurs inside the wavelength selective switch 100, the MEMS mirror array 105 moves, and it is possible to change a position thereof. Consequently, even when there is a change in the dispersion characteristics due to the temperature change, accurate switching is possible.

In the wavelength selective switch 100 according to the first embodiment, the piezo actuator 141 has been used for driving the HEMS mirror array 105 in the direction of array. However, instead of the piezo actuator 141, a driving unit such as a micro meter with a motor or some other actuator can be used.

Moreover, instead of the HEMS mirror array 105 being subjected to a translational drive in a direction of dispersion of wavelength with respect to the substrate 109, or instead of undergoing translational drive, the lens 104 may be subjected to translational drive in the direction of dispersion of wavelength. The translational drive of the lens 104, for instance, can also be carried out by a driving mechanism in which the piezo actuator 141 is used similarly as the translational drive of the abovementioned HEMS mirror array 105.

Moreover, in the wavelength selective switch 100 according to the first embodiment, the control value of the driver circuit 132 corresponding to the amount of drive of the MEMS mirror array 105 is referred to by using the CPU 131, the LUT 133, and the memory 134. However, the control value may be converted from the temperature without using the LUT 133. For instance, a conversion formula for converting the control value of the driver circuit 132 corresponding to the temperature and not the LUT 133 may be stored in advance in the memory 134, and the control value may be calculated based on the conversion formula according to the temperature which has been received.

Since the wavelength selective switch 100 according to the first embodiment includes the control mechanism 106 which refers to the amount of drive, even when there is a change in the amount of position shift of the MEMS mirror array 105 and each wavelength due to a secular change, the amount of drive can be changed easily by rewriting the table and carrying out correction of a computer program.

Second Embodiment

Figure 9:
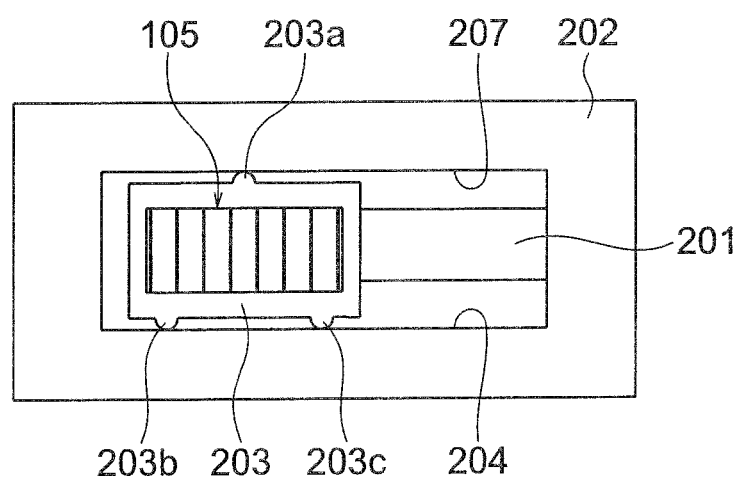
FIG. 9 is a diagram showing a structure of a driving mechanism according to a second embodiment.

FIG. 9 is a diagram showing a structure of a driving mechanism according to a second embodiment. A wavelength selective switch according to the second embodiment, with respect to the first embodiment, uses an expanding and contracting member 201 as the driving mechanism 108 of the MEMS mirror array 105 (FIG. 9), and does not use the control mechanism 106 and the temperature sensor 107. In the following description, the driving mechanism of which, the structure differs from the first embodiment is described, and description in detail of the rest of the structure is omitted.

The MEMS mirror array 105 is accommodated inside a case member 203, and the case member 203 is held inside an MEMS mirror holding member 202. A protrusion 203a which makes a contact with an inner wall 207 of the MEMS mirror holding member 202, and protrusions 203b and 203c which make a contact with an inner wall 204 facing the case member 203 and which is on the inner wall 207 of the MEMS mirror holding member 202 are provided on an outer surface of the case member 203.

One side of the expanding and contracting member 201 is connected to the MEMS mirror array 105 and the other side of the expanding and contracting member 201 is connected to the MEMS mirror holding member 202 such that the expanding and contracting member 201 expands and contracts only in a direction of dispersion of wavelength (direction of array or a left-right direction in FIG. 9) of a light incident on the MEMS mirror array 105.

The expanding and contracting member 201 is formed of a material such as aluminum having a substantial coefficient of linear expansion, and expands and contracts with the change in the temperature.

According to the abovementioned structure, with the change in the temperature, the MEMS mirror array 105 is capable of changing a position only by an amount of expansion and contraction of the expanding and contracting member 201 while sliding on the MEMS mirror holding member 202. In other words, it is possible to change the position in the direction of dispersion of wavelength of the optical system of the light incident on the MEMS mirror array 105.

An operation of the driving mechanism according to the second embodiment will be described below by using FIG. 10A, FIG. 10B, and FIG. 10C. FIG. 10A is a diagram showing a state of the driving mechanism at a room temperature, FIG. 10B is a diagram showing a shift of incident rays in a direction of mirror array when the temperature has become higher than the room temperature, and FIG. 10C is a diagram showing a shift of the MEMS mirror array in a direction of mirror array 105 when the temperature has become higher than the room temperature.

In an example shown in FIG. 10A, at room temperature, the setting is carried out such that the incident rays are incident on each mirror of the MEMS mirror array 105.

Whereas, when the surrounding atmosphere changes and the temperature inside the wavelength selective switch goes on rising, due to the change in the refractive index of the grating 103 and so on, the incident rays on the MEMS mirror array 105 go on shifting in the direction of dispersion of wavelength (FIG. 10B).

On the other hand, the amount of expansion and contraction of the expanding and contracting member 201 due to the change in the temperature has been associated with the amount of shift of the incident rays due to the same change in the temperature. Therefore, the expanding and contracting member 201 expands and contracts by a predetermined amount with the rise in the temperature. Accordingly, the MEMS mirror array 105 changes the position only by an amount E21 corresponding to the amount of shift of the incident rays (FIG. 10C). In diagrams from FIG. 10A to FIG. 10C, a case of a rise in the temperature has been shown. However, when the temperature falls, similar phenomenon occurs in a direction opposite to the direction at the time of temperature rise.

FIG. 10B and FIG. 10C are shown as two separate diagrams for making the description of the operation of the driving mechanism easily understandable. However, practically, the expansion and contraction of the expanding and contracting member 201 and the shift of the incident rays progress simultaneously, and there is no delay when the HEMS mirror array 105 moves to the desired position.

Figure 11:
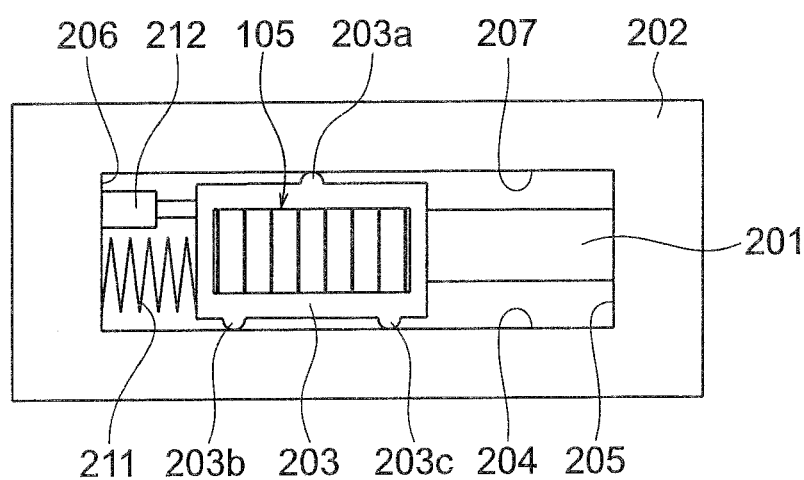
FIG. 11 is a diagram showing a structure of a driving mechanism according to a modified embodiment of the second embodiment.

A boundary in the direction of dispersion of wavelength of each of the expanding and contracting member 201, and the MEMS mirror holding member 202 and the case member 203, instead of being fixed, may be making a contact. In this case, for instance, as shown in FIG. 11, two ends of the expanding and contracting member 201 make a contact with an inner wall 205 of the HEMS mirror holding member 202 and one end of the case member 203 respectively, as well as a shock-absorbing member 212 and an elastic member 211 are connected to the other end of the case member 203, opposite to the expanding and contracting member 201. A damper is available as the shock-absorbing member 212, and a member such as a spring similar to the elastic member 142 of the first embodiment is to be used as the elastic member 211. Moreover, the shock-absorbing member 212 and the elastic member 211 are connected to an inner wall 206 which is an inner wall of the MEMS mirror holding member 202, and which is facing the inner wall 205. Here, FIG. 11 is a diagram showing a structure of a driving mechanism according to a modified embodiment of the second embodiment.

According to the wavelength selective switch of the second embodiment, wiring from the driving mechanism 108 and the control mechanism 106, the temperature measuring section (the temperature sensor 107 and the temperature monitor 135), and the control mechanism 106, in the first embodiment, being unnecessary, it is possible to simplify the overall wavelength selective switch.

The rest of the structure, action, and effect are similar as in the first embodiment.

Third Embodiment

Figure 12:
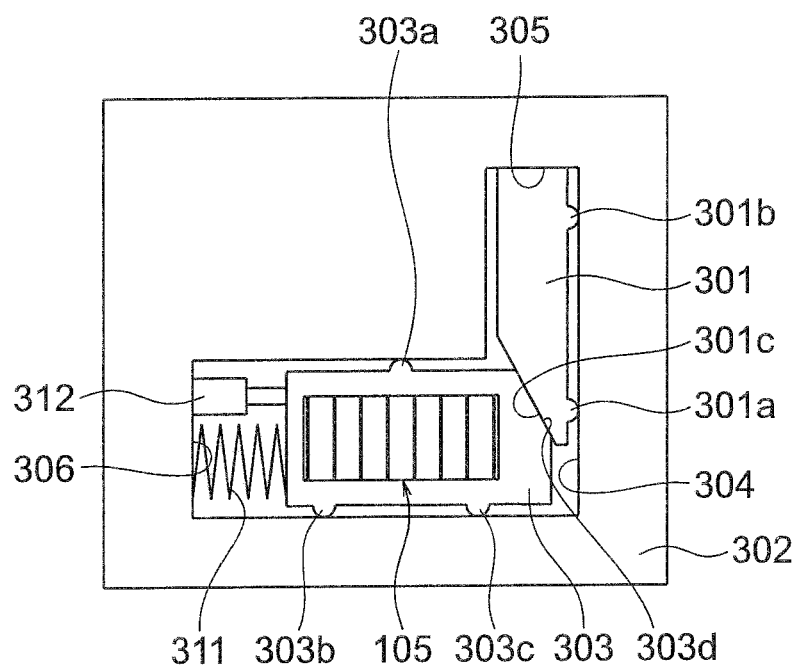
FIG. 12 is a diagram showing a structure of a driving mechanism according to a third embodiment.

FIG. 12 is a diagram showing a structure of a driving mechanism according to a third embodiment.

A wavelength selective switch according to the third embodiment differs from the wavelength selective switch according to the second embodiment with regard to a direction of expansion and contraction of an expanding and contracting member 301, and a direction of movement of the MEMS mirror array 105. In other words, in the second embodiment, the direction of expansion and contraction of the expanding and contracting member 201 is in the direction of movement of the MEMS mirror array 105. However, in the third embodiment, the direction of expansion and contraction of the expanding and contracting member 301 and the direction of movement of the MEMS mirror array 105 are at a constant angle (such as 90 degrees).

In the third embodiment, with respect to the wavelength selective switch 100 according to the first embodiment, the wavelength selective switch includes the expanding and contracting member 301 and an elastic member 311 instead of the piezo actuator 141 and the elastic member 142.

The MEMS mirror array 105 is accommodated inside a case member 303, the case member 303 is held inside an MEMS mirror holding member 302 such that the MEMS mirror array 105 is movable in the direction of array. A protrusion 303a which makes a contact with an inner wall of the MEMS mirror holding member 302, and protrusions 303b and 303c which make a contact with an inner wall of the HEMS mirror holding member 302 are provided on an outer surface of the case member 303. A contact end surface 303d with which, a lower end surface 301c of the expanding and contracting member 301 makes a contact is provided at one end in the direction of array of the case member 303. Both the lower end surface 301c and the contact end surface 303d are flat surfaces. The lower end surface 301c of the expanding and contracting member 301 and the contact end surface 303d of the case member 303 are formed to make a mutual contact making a constant angle with respect to the direction of array.

An upper end of the expanding and contracting member 301 is fixed to an inner wall 305 of the MEMS mirror holding member 302. Moreover, protrusions 301a and 301b which make a contact with an inner wall 304 of the MEMS mirror holding member 302 are provided on an outer surface of the expanding and contracting member 301.

One end of the expanding and contracting member 301 makes a contact with the MEMS mirror array 105 such that the expansion and contraction are reflected only in the direction of dispersion of wavelength (a left-right direction in FIG. 12) of the incident rays on the MEMS mirror array 105, and the other end of the expanding and contracting member 301 is connected to the inner wall 304 of the MEMS mirror holding member 302. Furthermore, the expanding and contracting member 301 is arranged such that the direction of expansion and contraction is disposed at a constant angle in the direction of dispersion of wavelength.

The elastic member 311 and a shock-absorbing member 312 are arranged such that, one side of the elastic member 311 and one side of the shock-absorbing member 312 are connected to or makes a contact with the MEMS mirror array 105, and the other side of the elastic member 311 and the other side of shock-absorbing member 312 are connected to or makes a contact with a left-side inner wall 306 of the MEMS mirror holding member 302, such that each of the elastic member 311 and the shock-absorbing member 312 expands and contracts in the direction of dispersion of wavelength.

The expanding and contracting member 301 is formed of a material such as aluminum having a substantial coefficient of linear expansion, and which expands and contracts with the change in the temperature. Therefore, with the change in the temperature, the MEMS mirror array 105 is capable of changing the position in proportion to the amount of expansion and contraction of the expanding and contracting member 301, with respect to the MEMS mirror holding member 302. In other words, it is possible to change the position of the MEMS mirror array 105 linearly in the direction of dispersion of wavelength.

When a contact portion of the MEMS mirror array 105 and the expanding and contracting member 301 is let to be a curved line (a curved surface), it is possible to let the change in position of the MEMS mirror array 105 in the direction of dispersion of wavelength with the change in the temperature to be a non-linear shape.

Figure 13A:
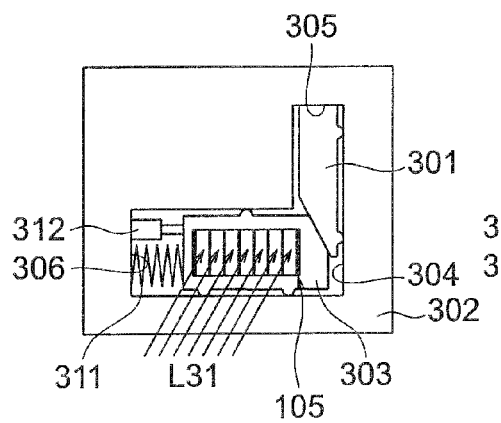
FIG. 13A is a diagram showing a state of the driving mechanism at the room temperature.
Figure 13B:
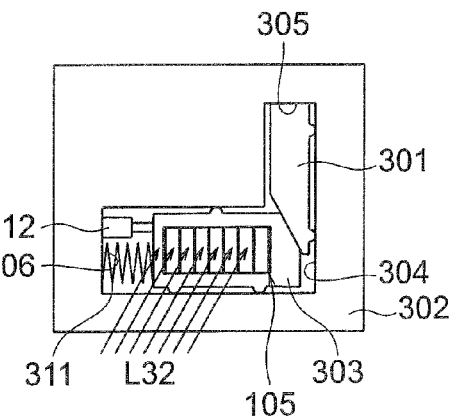
FIG. 13B is a diagram showing a shift of incident rays in a direction of mirror array when the temperature has become higher than the room temperature.
Figure 13C:
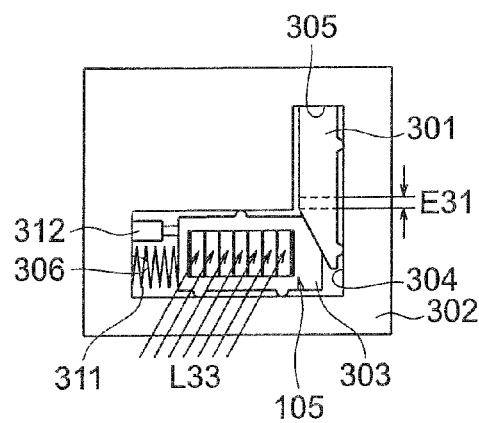
FIG. 13C is a diagram showing a shift of the MEMS mirror array in a direction of mirror array when the temperature has become higher than the room temperature.

An operation of the structure will be described below by using FIG. 13A, FIG. 13B, and FIG. 13C, FIG. 13A is a diagram showing a state of the driving mechanism at the room temperature, FIG. 13B is a diagram showing a shift of incident rays in a direction of mirror array when the temperature has become higher than the room temperature, and FIG. 13C is a diagram showing a shift of MEMS mirror array in a direction of mirror array when the temperature has become higher than the room temperature.

From the state in FIG. 13A, when the surrounding atmosphere changes and the temperature goes on rising, due to the change in the refractive index of the grating 103 and so on, the incident rays on the MEMS mirror array 105 go on shifting in the direction of dispersion of wavelength (left-right direction in FIG. 12 and FIG. 13A to FIG. 13C), as shown in FIG. 13B.

Meanwhile, the amount of expansion and contraction by the change in the temperature of the expanding and contracting member 301 is optimized. Concretely, the amount of expansion and contraction which has been calculated from the coefficient of linear expansion of the expanding and contracting member 301 is optimized such that the amount of shift of the incident rays due to the change in the temperature (FIG. 13B), and the amount of movement of the MEMS mirror array 105 are associated. Accordingly, with the rise in the temperature, the MEMS mirror array 105 changes the position only by an amount E31 corresponding to the amount of shift of the incident rays (FIG. 13C). In diagrams from FIG. 13A to FIG. 13C, a case of a rise in the temperature has been shown. However, a case of a drop in the temperature, similar phenomenon occurs in a direction opposite to the direction at the case of temperature rise.

FIG. 13B and FIG. 13C are shown as two separate diagrams for making the description of the operation of the driving mechanism easily understandable. However, practically, the expansion and contraction of the expanding and contracting member 301 and the shift of the incident rays progress simultaneously, and there is no delay when the MEMS mirror array 105 moves to the desired position.

In the description made above, the contact end surface 303d of the case member 303 and the lower end surface 301c of the expanding and contracting member 301 are let to be flat surfaces, and the change in the amount of movement of the MEMS mirror array 105 in the direction of dispersion of wavelength is let to be linear. However, when the contact end surface 303d and the lower end surface 301c are let to be curved surfaces which can be in a mutual contact, it is possible to let the amount of movement of the MEMS mirror array 105 in the direction of dispersion of wavelength to be a non-linear shape.

In the wavelength selective switch according to the third embodiment, a non-linear movement due to the expansion and contraction of the linear-shaped expanding and contracting member is possible.

The rest of the structure, action, and effect are similar as in the first embodiment and the second embodiment.

Fourth Embodiment

Figure 14:
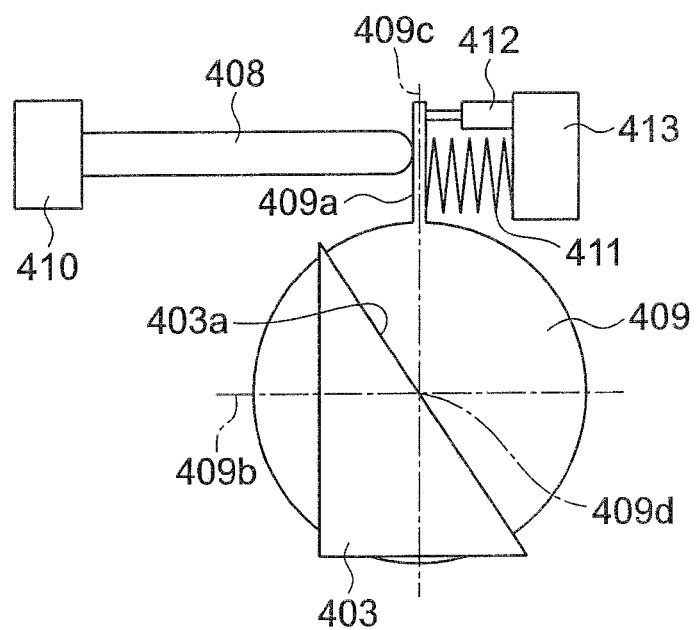
FIG. 14 is a diagram showing a structure of a rotating mechanism according to a fourth embodiment.

A wavelength selective switch according to a fourth embodiment of the present invention will be described below. FIG. 14 is a diagram showing a structure of a rotating mechanism (driving mechanism) according to the fourth embodiment. The rotating mechanism is a mechanism for changing a direction of a grating 403. The wavelength selective switch according to the fourth embodiment is a wavelength selective switch in which, the driving mechanism 108 of the MEMS mirror array 105, the temperature sensor 107, and the control mechanism 106 are omitted from the wavelength selective switch 100 according to the first embodiment, and for the grating 403 having a structure similar to the grating 103 of the first embodiment, the rotating mechanism shown in FIG. 14 has been installed. At the room temperature, the arrangement of the grating 403 is similar as in the first embodiment, and an operation of the apparatus as a whole is also similar.

Figure 15:
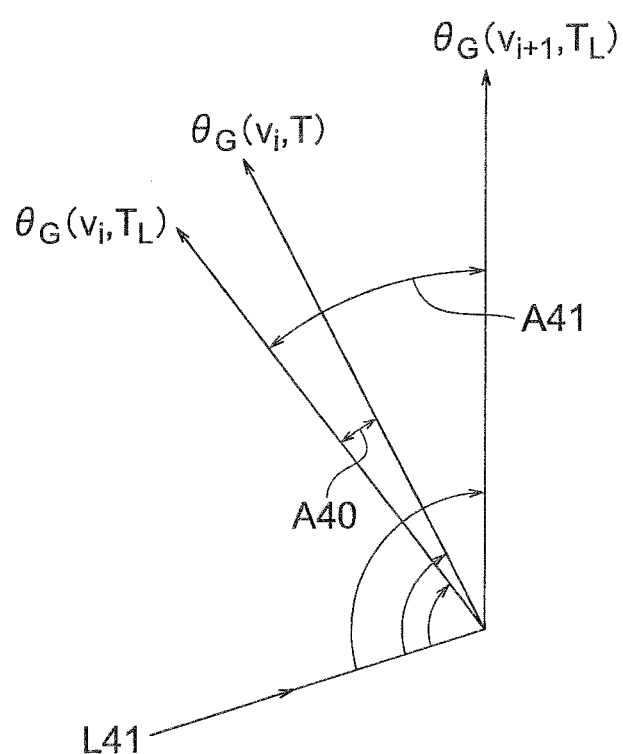
FIG. 15 is a diagram showing a change in an angle of deflection by a grating according to the fourth embodiment, with respect to a change in the temperature.

FIG. 15 is a diagram showing a change in an angle of deflection by the grating 403 with respect to the change in the temperature.

An angle made by a light ray L41 which is incident on the grating 403 and a light ray which is launched from the grating 403 is let to be the angle of deflection, and an angle of deflection of light of frequency $v_i$ at temperature T by the grating 403 is let to be $\theta_G(v_i, T)$.

The optical characteristics of the grating change when the temperature has changed. The main cause is a change in the refractive index of the immersion medium of the grating 403. Therefore, even when the angle of incidence with respect to the grating 403 is the same, the angle of output changes. In other words, when $T \neq T_L$, $\theta_G(v_i, T) \neq \theta_G(v_i, T_L)$ is satisfied.

However, it is possible to let $\theta_G(v_i, T) = \theta_G(v_i, T_L)$ by rotating the grating 403 at the temperature T through a certain angle $\Delta\theta(T)$. By imparting rotation $\Delta\theta(T)$ of the grating 403 for each of T in $T_L < T < T_H$, when an arrangement is made such that the following expression (3) is satisfied for all $v_{iL} \leq v_i \leq v_{iH-1}$, it can be said that there is almost no change in the angle of deflection of light of frequency $v_i$ in the temperature range $T_L < T < T_H$.

$$\left| \frac{\theta_G(v_i, T) - \theta_G(v_i, T_L)}{\theta_G(v_i, T_L) - \theta_G(v_{i+1}, T_L)} \right| \leq 0.05 \quad (3)$$

A numerator in expression (3) corresponds to an angle A40 in FIG. 15, and a denominator in expression (3) corresponds to an angle A41 in FIG. 15.

Moreover, when the dispersive element is divided into two or more than two members, the angle of incidence and the angle of output are defined by considering the members as integrated. Furthermore, the member to be rotated may be at least one of the two members.

A structure of the rotating mechanism of the grating 403 will be described below while referring to FIG. 14. The rotating mechanism shown in FIG. 14 includes a seating 409, an expanding and contracting member 408, an elastic member 411, and a shock-absorbing member 412.

The seating 409 includes a circular-shaped flat surface having an axis 409d as a center, as an upper surface. The axis 409d is orthogonal to each of two axes 409b and 409c which are mutually perpendicular in the flat surface of the seating 409. An arm portion 409a which is extended in a direction of the axis 409c is formed from an outer periphery of the circular-shaped flat surface of the seating 409. The seating 409 is rotatably supported axially with respect to the axis 409d which is perpendicular to the direction of dispersion of wavelength as well as an optical axial direction (perpendicular to a paper surface in FIG. 14) with respect to the substrate 109 (FIG. 1) by a shaft member which is not shown in the diagram. Moreover, the grating 403 is held fix on an upper surface of the seating 409.

The expanding and contracting member 408 is a pillar-shaped member, and one end in an axial direction thereof is connected to or makes a contact with the axis 409c of the seating 409. Moreover, the other end in the axial direction of the expanding and contracting member 408 is connected to or makes a contact with a base portion 410 which is fixed to the substrate 109. An arrangement is made such that, a straight line joining positions at which, the expanding and contracting member 408, and the base portion 410 and the axis 409c are connected or make a contact does not pass through the axis 409d around which the seating 409 is rotatably supported axially. In other words, the axial direction of the expanding and contracting member 408 does not intersect with the axis 409d.

The expanding and contracting member 408 is formed of a material such as aluminum having a substantial coefficient of linear expansion, and expands and contracts with the change in the temperature. Therefore, with the change in the temperature, the grating 403 is capable of changing an angle with respect to the axis 409d which is perpendicular to the direction of dispersion of wavelength as well as in the optical axial direction, with respect to the base portion 410, and a base portion 413.

The elastic member 411 is a member such as a spring. One end of the elastic member 411 is connected to or makes a contact with the axis 409c of the seating 409, and the other end of the elastic member 411 is connected to or makes a contact with the base portion 413 which is fixed to the substrate 109. Consequently, the elastic member 411 and the expanding and contracting member 408 are disposed to be facing mutually, sandwiching the axis 409c of the seating 409.

The shock-absorbing member 412 is a member such as a damper. Similarly as the elastic member 411, one end of the shock-absorbing member 412 is connected to or makes a contact with the axis 409c of the seating 409, and the other end of the shock-absorbing member 412 is connected to or makes a contact with the base portion 413. The shock-absorbing member 412 is disposed to be facing the expanding and contracting member 408, sandwiching the axis 409c of the seating 409.

Figure 16A:
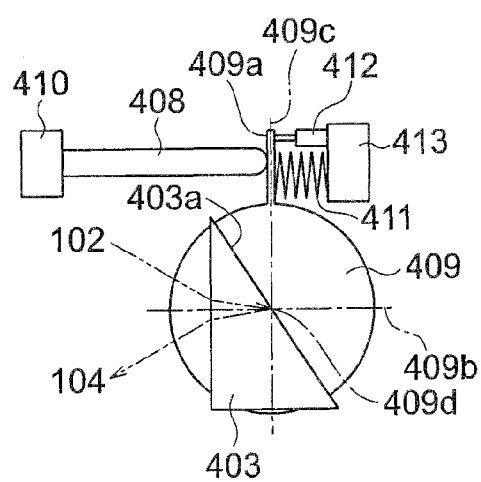
FIG. 16A is a diagram showing a state of the rotating mechanism at the room temperature.
Figure 16B:
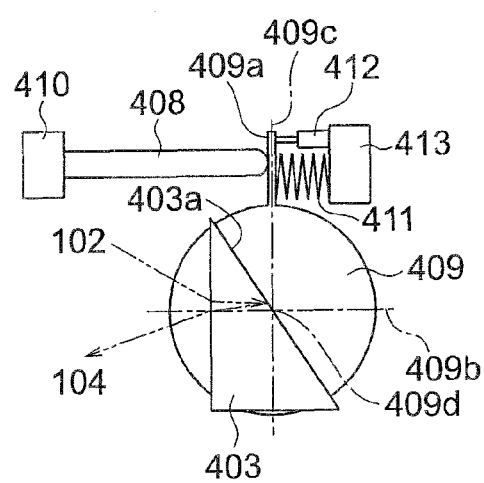
FIG. 16B is a diagram showing the change in the angle of deflection when the temperature has become higher than the room temperature.

An operation of the structure will be described below by using FIG. 16A, FIGS. 16B, and 16C. FIG. 16A is a diagram showing a state of the rotating mechanism at the room temperature, FIG. 16B is a diagram showing the change in the angle of deflection when the temperature has become higher than the room temperature, and FIG. 16C is a diagram showing a rotation of the seating 409 when the temperature has become higher than the room temperature.

In the state at the room temperature shown in FIG. 16A, incident light from the micro lens array 102 is dispersed at a point coinciding with the axis 409d, which is on an inclined surface of the grating 403, and is launched toward the lens 104. From the state at the room temperature shown in FIG. 16A, when the surrounding atmosphere changes and the temperature goes on rising, due to the change in the refractive index of the grating 403 and so on, the angle of output of the light from the grating 403 directed toward the lens 104 also changes (FIG. 16B). Therefore, an angle made by a light ray from the fiber array 101 and a light ray directed toward the MEMS mirror array 105, or in other words, the angle of deflection decreases.

In the wavelength selective switch according to the fourth embodiment, the amount of expansion and contraction calculated from a coefficient of linear expansion of the expanding and contracting member 408 and the amount of change in the angle of deflection, due to the change in the temperature are mutually associated. Concretely, the expanding and contracting member 408 expands toward the base portion 413 only by an amount E41 corresponding to the amount of change in the angle of deflection, and accordingly, the seating 409 rotates around the axis 409d. Accordingly, an angle of incidence of light from the micro lens array 102 with respect to a diffraction surface 403a decreases (FIG. 16C). Consequently, with the rise in the temperature, the grating 403 is capable of changing an angle with respect to the incident light by an amount sufficient for correcting the amount of change in the angle of deflection.

Figure 16C:
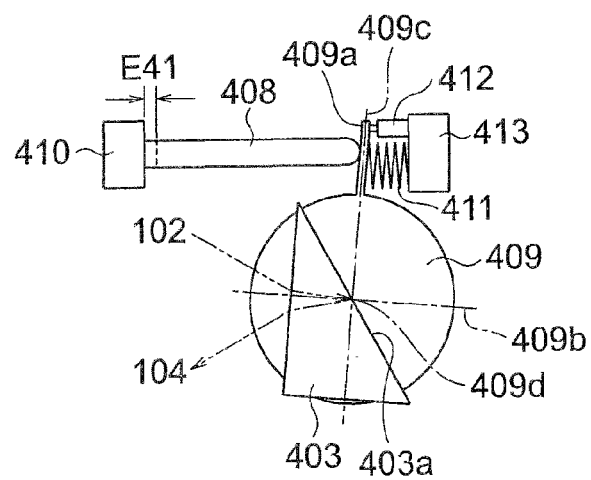
FIG. 16C is a diagram showing a rotation of a seating 409 when the temperature has become higher than the room temperature.

In other words, in FIG. 16A and FIG. 16C, the angle of deflection becomes same. Moreover, even when the temperature has fallen, similar phenomenon occurs in a direction opposite to the direction at the time of temperature rise.

FIG. 16B and FIG. 16C are shown as two separate diagrams for making description of the operation of the rotating mechanism easily understandable. However, practically, the two progress simultaneously, and there is no delay when the grating 403 moves to the desired position.

In the wavelength selective switch according to the fourth embodiment, by setting appropriately a distance from the axis 409d which is a center of rotation of the seating 409 up to a position at which, the expanding and contracting member 408 and the axis 409c of the seating make a mutual contact, it is possible to achieve the desired amount of rotation.

Moreover, the expanding and contracting member 408 may be a member provided with a controllable drive unit such as the piezo actuator 141 according to the first embodiment. In such case, it is preferable to provide the temperature sensor 107 and the control mechanism 106. The control value of the driver circuit 132 corresponding to the amount of rotational drive of the dispersive element may be referred to by using the CPU 131, the LUT 133, and the memory 134 in the control mechanism 106, or the control value may be converted from the temperature without using the LUT 133.

The rest of the structure, action, and effect are similar as in the first embodiment.

Fifth Embodiment

Figure 17:
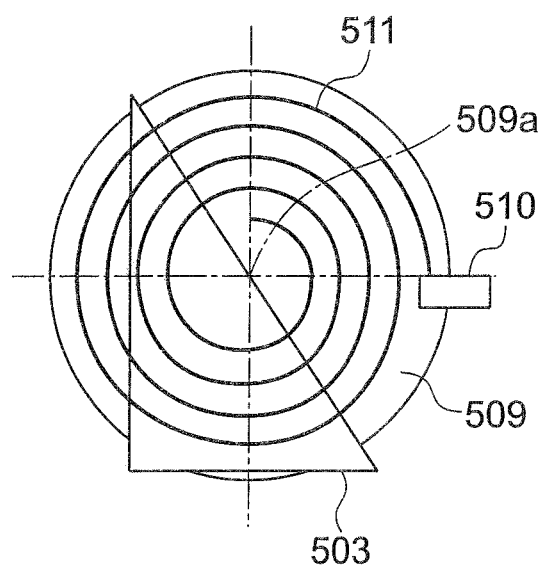
FIG. 17 is a diagram showing a structure of a rotating mechanism according to a fifth embodiment.

A wavelength selective switch according to a fifth embodiment will be described below by referring to FIG. 17. FIG. 17 is a diagram showing a structure of a rotating mechanism (driving mechanism) according to the fifth embodiment.

The wavelength selective switch according to the fifth embodiment differs from the wavelength selective switch according to the fourth embodiment at a point that, a structure of the rotating mechanism which changes a direction of a grating 503 is different.

The grating 503 has a structure similar to the structure of the grating 403 according to the fourth embodiment. The rotating mechanism shown in FIG. 17 includes a seating 509 and an expanding and contracting member 511.

The seating 509 is rotatable supported axially with respect to the axis 509a which is perpendicular to the direction of dispersion of wavelength as well as an optical axial direction (perpendicular to a paper surface in FIG. 17) with respect to a base portion 510 which has been fixed to the substrate 109 (FIG. 1). The seating 509 includes a circular-shaped flat surface having an axis 509a as a center, as an upper surface. The grating 503 is held on the upper surface of the seating 509.

The expanding and contracting member 511 is a member such as a spiral spring, and is disposed to be spring shaped from a side of the axis 509a of the seating 509 up to an outer peripheral side. Furthermore, the expanding and contracting member 511 is slidably held in a groove (not shown in the diagram) which has been provided in the upper surface of the seating 509. One end of the expanding and contracting member 511 toward the axis 509a is fixed to the seating 509 and the other end of the expanding and contracting member 511 is fixed to the base portion 510.

The expanding and contracting member 511 is formed of a material such as aluminum having a substantial coefficient of linear expansion, and expands and contracts with the change in the temperature. Consequently, when the expanding and contracting member 511 expands and contracts inside the groove with the change in the temperature, the seating 509 rotates around the axis 509a according to the expansion and contraction, and it is possible that the grating 503 changes an angle with respect to the axis 509a, with respect to the base portion 510.

According to such structure, it is easy to make an amount of rotation of the seating 509 substantial in the expanding and contracting member 511 than in the expanding and contracting member 408 according to the fourth embodiment.

In the wavelength selective switch according to the fifth embodiment, by setting appropriately the winding number of the expanding and contracting member 511, it is possible to achieve the desired amount of rotation.

The expanding and contracting member 511 may be a member provided with a controllable drive unit such as in the first embodiment.

Moreover, an arrangement may be made such that the movement of the MEMS mirror array 105 in the direction of dispersion of wavelength and the change in the angle of the grating 103 occur simultaneously.

The rest of the structure, action, and effect are similar as in the fourth embodiment.

As it has been described above, the wavelength selective switch according to the present invention is useful as a wavelength selective switch in which an accurate switching has been sought even when a temperature change occurs.

The wavelength selective switch according to the present invention shows an effect that an accurate switching is possible even when the dispersion characteristics of the dispersive element have changed due to the change in the temperature.

What is claimed is:

1. A wavelength selective switch including a substrate, wherein, on the substrate, the wavelength selective switch comprising:

at least one input port from which, wavelength-multiplexed light is made to be incident in the wavelength selective switch, a dispersive element which receives the light from the input port, and disperses the light, a light condenser element which converges light for each wavelength which has been dispersed by the light dispersive element, a light deflecting member including a plurality of deflecting elements, which is capable of deflecting light for each wavelength from the light condenser element, independently for each wavelength, an output port which receives light for each wavelength which has been deflected by the light deflecting member, and a driving mechanism which drives at least the light deflecting member, and wherein drive of the light deflecting member by the driving mechanism is a translational drive in a direction of dispersion of wavelength with respect to the substrate, wherein the plurality of deflecting elements are driven as a whole.

2. The wavelength selective switch according to claim 1, wherein the following expression (1) is satisfied for all $v_{iL} \leq v_i v_{iH-1}$ and $T_L < T < T_H$, $$\left| \frac{\overline{S(v_{iL}, T)S(v_i, T)} - \overline{S(v_{iL}, T_L)S(v_i, T_L)}}{\overline{S(v_i, T_L)S(v_{i+1}, T_L)}} \right| \le 0.05 \quad (1)$$

where, $v_i$ denotes a grid frequency, $v_{iL}$ denotes the lowest grid frequency of a spectral band, $v_{iH}$ denotes the highest grid frequency of the usable band, iL, i, and iH denote integer numbers which satisfy a relationship iL≤i≤iH, $v_i < v_{i+1}$, T denotes a temperature, $T_L$ denotes a lowest temperature in a range of a operating temperature, $T_H$ denotes a highest temperature in the range of the operating temperature, $T_L < T < T_H$, $S(v_i, T)$ is a point of intersection of a principal ray of light of the frequency $v_i$ at temperature T, and a plane overlapping with the light deflecting member, and a distance between two points $S_1$ and $S_2$ is expressed by the following expression (2), $$\overline{S_1 S_2} \quad (2).$$

3. The wavelength selective switch according to claim 2, comprising:
   a temperature measuring section which measures a temperature inside an apparatus; and
   a control section which receives temperature information from the temperature measuring section, and makes the driving mechanism drive by a drive amount based on the temperature information.

4. The wavelength selective switch according to claim 2, wherein the driving mechanism includes an expanding and contracting member which expands and contracts according to a change in the temperature.

5. The wavelength selective switch according to claim 1, wherein the following expression (3) is satisfied for all $v_{iL} \le v_i \le v_{iH-1}$ and $T_L < T < T_H$, $$\left| \frac{\theta_G(v_i, T) - \theta_G(v_i, T_L)}{\theta_G(v_i, T_L) - \theta_G(v_{i+1}, T_L)} \right| \le 0.05 \quad (3)$$

where, $\theta_G(v_i, T)$ is an angle of deflection by the deflecting element of light of frequency $v_i$ at temperature T.

6. The wavelength selective switch according to claim 5, comprising:
   a temperature measuring section which measures a temperature inside an apparatus; and
   a control section which receives temperature information from the temperature measuring section, and makes the driving mechanism drive by a drive amount based on the temperature information.

7. The wavelength selective switch according to claim 5, wherein the driving mechanism includes an expanding and contracting member which expands and contracts according to a change in the temperature.

8. The wavelength selective switch according to claim 1, wherein the dispersive element is further driven by a rotational drive around an axis perpendicular to the substrate.

9. The wavelength selective switch according to claim 1, wherein the light condenser element is further driven by an additional translational drive in a direction of dispersion of wavelength with respect to the substrate.

10. A wavelength selective switch including a substrate,
    wherein, on the substrate, the wavelength selective switch comprising:
    at least one input port from which, wavelength-multiplexed light is made to be incident in the wavelength selective switch,
    a dispersive element which receives the light from the input port, and disperses the light,
    a light condenser element which converges light for each wavelength which has been dispersed by the light dispersive element,
    a light deflecting member including a plurality of deflecting elements, which is capable of deflecting light for each wavelength from the light condenser element, independently for each wavelength,
    an output port which receives light for each wavelength which has been deflected by the light deflecting member, and
    a driving mechanism which drives at least the dispersive element, and
    wherein drive of the dispersive element by the driving mechanism is a rotational drive around an axis perpendicular to the substrate.

11. A wavelength selective switch including a substrate,
    wherein, on the substrate, the wavelength selective switch comprising:
    at least one input port from which, wavelength-multiplexed light is made to be incident in the wavelength selective switch,
    a dispersive element which receives the light from the input port, and disperses the light,
    a light condenser element which converges light for each wavelength which has been dispersed by the light dispersive element,
    a light deflecting member including a plurality of deflecting elements, which is capable of deflecting light for each wavelength from the light condenser element, independently for each wavelength,
    an output port which receives light for each wavelength which has been deflected by the light deflecting member, and
    a driving mechanism which drives at least the light condenser element, and
    wherein drive of the light condenser element by the driving mechanism is a translational drive in a direction of dispersion of wavelength with respect to the substrate.

* * * * *